Patented Jan. 4, 1949

2,458,430

UNITED STATES PATENT OFFICE 2,458,430

MEDICINAL SOLUTIONS

Reinhard Schläpfer, Basel, Switzerland, assignor to Hoffmann-La Roche Inc., Nutley, N. J., a corporation of New Jersey No Drawing. Application May 16, 1946, Serial No. 670,307. In Switzerland June 5, 1945

6 Claims. (Cl. 167—81)

This invention relates to the manufacture of solutions.

It has been found according to the present invention that, in the manufacture of solutions, pyridyl-3-carbinol is a suitable agent for increasing the solubility of medicinal preparations which are difficultly soluble or insoluble in water. When using pyridyl-3-carbinol or a mixture thereof with water as solvent, the solubility of, say, lactoflavin, 2-methyl-naphthoquinone-(1,4), neohesperidine, and others, is considerably higher than in water alone.

Pyridyl-3-carbinol may, for instance, be prepared by causing nitrous acid to act on the amine obtained by hydrogenation of nicotinic acid nitrile. The medicinal solutions prepared with the aid of pyridyl-3-carbinol are suitable for oral as well as parenteral administration. They are, even without dilution with water, characterized by the fact that they do not produce any irritation or other undesired reaction in the organism.

The following examples illustrate how the present process may be carried into effect, without, however, limiting the invention thereto. The parts are by weight. The dissolution takes place at room temperature, if nothing else is stated.

Example 1

1 part of lactoflavin is dissolved at 40° C. in 40 parts of pyridyl-3-carbinol and 160 parts of water. A stable, yellow solution with green fluorescence is thus obtained.

1 to 1.2 parts of lactoflavin are soluble at 27.5° C. in 10,000 parts of water. 1 part of lactoflavin is soluble in 200 parts of a 20 per cent solution by volume of pyridyl-3-carbinol in water.

Example 2

0.5 parts of 2-methyl-naphthoquinone-(1,4) are dissolved in a solution of equal parts by weight of pyridyl-3-carbinol and water to give a volume of 100 parts.

3 to 4 parts of 2-methyl-naphthoquinone-(1,4) are soluble in 10,000 parts of water. 0.5 part of 2-methyl-naphthoquinone-(1,4) are soluble in 100 parts of 50 per cent aqueous pyridyl-3-carbinol.

Example 3

3 parts of neohesperidine are treated with 20 parts of pyridyl-3-carbinol and 80 parts of water, whereby a clear and stable solution is obtained.

6 to 7 parts of neohesperidine are soluble at 18° C. in 10,000 parts of water; 3.8 parts are soluble at 18° C. in a mixture of 20 parts of pyridyl-3-carbinol and 80 parts of water.

I claim:

1. Medicinal solution composed of 1 part of lactoflavin, 160 parts of water and 40 parts of pyridyl-3-carbinol as a solubilizer.

2. A medicinal solution containing water, a difficultly soluble medicinally active substance selected from the group consisting of lactoflavin, 2-methyl-naphthoquinone-(1,4) and neohesperidine dissolved therein in an amount greater than its normal water solubility, and pyridyl-3-carbinol as a solubilizer.

3. A medicinal solution containing water, lactoflavin dissolved therein in an amount greater than its normal water solubility, and pyridyl-3-carbinol as a solubilizer.

4. A medicinal solution containing water, 2-methyl-naphthoquinone-(1,4) dissolved therein in an amount greater than its normal water solubility, and pyridyl-3-carbinol as a solubilizer.

5. A medicinal solution containing water, neohesperidine dissolved therein in an amount greater than its normal water solubility and pyridyl-3-carbinol as a solubilizer.

6. A medicinal solution composed of three parts of neohesperidine, 80 parts of water, and 20 parts of pyridyl-3-carbinol as a solubilizer.

REINHARD SCHLÄPFER.

REFERENCES CITED

The following references are of record in the file of this patent:

FOREIGN PATENTS

| Number  | Country | Date          |
|---------|---------|---------------|
| 662,812 | Germany | July 22, 1938 |

OTHER REFERENCES

Berichte der Deutsche Chemische Gesellschaft, vol. 33, page 3498 (1900).